US011299652B2

(12) United States Patent
Barnes et al.

(10) Patent No.: US 11,299,652 B2
(45) Date of Patent: Apr. 12, 2022

(54) CYANOACRYLATE COMPOSITIONS

(71) Applicant: Henkel IP & Holding GmbH, Duesseldorf (DE)

(72) Inventors: Rory B. Barnes, Dublin (IE); Rachel Hersee, Dublin (IE); Barry N. Burns, Dublin (IE)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 16/858,666

(22) Filed: Apr. 26, 2020

(65) Prior Publication Data

US 2020/0255706 A1 Aug. 13, 2020

Related U.S. Application Data

(63) Continuation of application No. PCT/EP2018/079498, filed on Oct. 26, 2018.

(51) Int. Cl.
*C08L 33/18* (2006.01)
*C08L 33/22* (2006.01)
*C09J 133/18* (2006.01)
*C09J 133/22* (2006.01)
*C09J 4/06* (2006.01)
*B29C 65/48* (2006.01)
*C09J 11/08* (2006.01)
*C08F 222/32* (2006.01)
*C08L 33/14* (2006.01)

(52) U.S. Cl.
CPC .............. *C09J 4/06* (2013.01); *B29C 65/484* (2013.01); *C08F 222/327* (2020.02); *C08L 33/22* (2013.01); *C09J 11/08* (2013.01); *C09J 133/22* (2013.01); *C08F 222/324* (2020.02); *C08L 33/14* (2013.01); *C08L 33/18* (2013.01); *C09J 133/18* (2013.01)

(58) Field of Classification Search
CPC ....... C09J 133/18; C09J 133/22; C08L 33/18; C08L 33/22
See application file for complete search history.

(56) References Cited

U.S. PATENT DOCUMENTS

| 3,832,334 | A | 8/1974 | O'Sullivan et al. |
|---|---|---|---|
| 4,196,271 | A | 4/1980 | Yamada et al. |
| 4,440,910 | A | 4/1984 | O'Connor |
| 4,450,265 | A | 5/1984 | Harris |
| 4,490,515 | A | 12/1984 | Mariotti et al. |
| 4,532,293 | A | 7/1985 | Ikeda et al. |
| 4,556,700 | A | 12/1985 | Harris et al. |
| 4,622,414 | A | 11/1986 | McKervey |
| 4,636,539 | A | 1/1987 | Harris et al. |
| 4,695,615 | A | 9/1987 | Leonard et al. |
| 4,718,966 | A | 1/1988 | Harris et al. |
| 4,837,260 | A | 6/1989 | Sato et al. |
| 4,855,461 | A | 8/1989 | Harris |
| 4,906,317 | A | 3/1990 | Liu |
| 5,288,794 | A | 2/1994 | Attarwala |
| 5,312,864 | A | 5/1994 | Wenz et al. |
| 5,340,873 | A | 8/1994 | Mitry |
| 5,530,037 | A | 6/1996 | McDonnell et al. |
| 6,607,632 | B1 | 8/2003 | McDonnell et al. |
| 6,833,196 | B1 | 12/2004 | Wojciak |
| 7,238,828 | B2 * | 7/2007 | Liu .......................... C09D 4/00 558/442 |
| 7,687,561 | B1 * | 3/2010 | Misiak .................... C09J 133/18 524/357 |
| 8,192,731 | B2 * | 6/2012 | Misiak ....................... C09J 4/00 424/78.37 |
| 8,303,705 | B2 * | 11/2012 | Barnes .................... C09J 135/04 106/287.2 |
| 8,580,888 | B2 * | 11/2013 | Tully ...................... C08G 59/72 524/755 |
| 8,609,780 | B2 | 12/2013 | Misiak et al. |
| 8,742,048 | B2 * | 6/2014 | Hersee .................... C09J 135/04 526/298 |
| 8,877,868 | B2 * | 11/2014 | Heemann ............... C09J 133/18 525/244 |
| 8,981,027 | B2 * | 3/2015 | Ward ...................... C09J 135/04 526/298 |
| 9,120,957 | B2 * | 9/2015 | Hedderman .......... B29C 65/484 |

(Continued)

FOREIGN PATENT DOCUMENTS

EP 2995663 3/2016
JP 6-145606 A * 5/1994 ................ C09J 4/04

(Continued)

OTHER PUBLICATIONS

H. V. Coover, D. W. Dreifus and J. T. O'Connor, "Cyanoacrylate Adhesives" in Handbook of Adhesives, 27, pp. 463-477, I. Skeist, ed., Van Nostrand Reinhold, New York, 3rd ed. (1990).
G. H. Millet, "Cyanoacrylate Adhesives" in Structural Adhesives: Chemistry and Technology, S.R. Hartshorn, ed., Plenun Press, New York, pp. 249-307 (1986).
International Search Report issued in International Patent Application No. PCT/EP2018/079495 dated Jan. 30, 2019.
International Search Report issued in International Patent Application No. PCT/EP2018/079498 dated Jan. 30, 2019.

Primary Examiner — Rip A Lee

(74) Attorney, Agent, or Firm — Steven C. Bauman

(57) ABSTRACT

This invention relates to cyanoacrylate-containing compositions that include (a) a beta-alkoxy cyanoacrylate component, (b) a cyanoacrylate component selected from butyl cyanoacrylates, octyl cyanoacrylates, and combinations thereof; (c) a rubber toughening component (d) a surface modified component; and (e) an adhesion promoter. Cured products of the inventive cyanoacrylate compositions demonstrate improved toughness without an odor typically found with cyanoacrylate-containing compositions.

19 Claims, No Drawings

(56) References Cited

U.S. PATENT DOCUMENTS

| | | | |
|---|---|---|---|
| 9,371,470 B2* | 6/2016 | Barnes | C09J 4/06 |
| 9,427,829 B2* | 8/2016 | Liu | B22F 1/0062 |
| 9,657,120 B1* | 5/2017 | Phelan | C08F 20/00 |
| 10,196,471 B1* | 2/2019 | Gherardi | C08F 216/1416 |
| 2014/0124137 A1 | 5/2014 | Hedderman et al. | |
| 2017/0233618 A1* | 8/2017 | Phelan | C08F 22/32 |
| | | | 156/330.9 |
| 2020/0255692 A1* | 8/2020 | Cobo | C09J 4/00 |
| 2020/0255693 A1* | 8/2020 | Cobo | C08F 291/02 |

FOREIGN PATENT DOCUMENTS

| | | |
|---|---|---|
| WO | 2010029134 | 3/2010 |
| WO | 2013112315 | 8/2013 |
| WO | 2017077091 | 5/2017 |
| WO | 2017202698 | 11/2017 |

* cited by examiner

CYANOACRYLATE COMPOSITIONS

BACKGROUND

Field

This invention relates to cyanoacrylate-containing compositions that include (a) a beta-alkoxy cyanoacrylate component, (b) a cyanoacrylate component selected from butyl cyanoacrylates, octyl cyanoacrylates, and combinations thereof; (c) a rubber toughening component; (d) a surface modified component; and (e) an adhesion promoter. Cured products of the inventive cyanoacrylate compositions demonstrate improved toughness without an odor typically found with cyanoacrylate-containing compositions.

Brief Description of Related Technology

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives,* 27, 463-77, I. Skeist, ed., Van Nostrand Reinhold, New York, 3rd ed. (1990). See also G. H. Millet, "Cyanoacrylate Adhesives" in *Structural Adhesives: Chemistry and Technology,* S. R. Hartshorn, ed., Plenun Press, New York, p. 249-307 (1986).

U.S. Pat. No. 4,440,910 (O'Connor) pioneered rubber toughened cyanoacrylate compositions through the use of certain organic polymers as toughening additives that are elastomeric, i.e., rubbery, in nature. The '910 patent is thus directed to and claims a curable adhesive comprising a substantially solvent-free mixture of: (a) a cyanoacrylate ester, and (b) about 0.5% to about 20% by weight of an elastomeric polymer. The elastomeric polymer is selected from elastomeric copolymers of a lower alkene monomer and (i) acrylic acid esters, (ii) methacrylic acid esters or (iii) vinyl acetate. More specifically, the '910 patent notes that as toughening additives for cyanoacrylates, acrylic rubbers; polyester urethanes; ethylene-vinyl acetates; fluorinated rubbers; isoprene-acrylonitrile polymers; chlorosulfinated polyethylenes; and homopolymers of polyvinyl acetate were found to be particularly useful.

The elastomeric polymers are described in the '910 patent as either homopolymers of alkyl esters of acrylic acid; copolymers of another polymerizable monomer, such as lower alkenes, with an alkyl or alkoxy ester of acrylic acid; and copolymers of alkyl or alkoxy esters of acrylic acid. Other unsaturated monomers which may be copolymerized with the alkyl and alkoxy esters of acrylic include dienes, reactive halogen-containing unsaturated compounds and other acrylic monomers such as acrylamides.

Conventional commercial ethyl cyanoacrylate compositions have an odor, which some end users find offensive. β-methoxy ethyl cyanoacrylate is known to not have the same odor. Ethyl cyanoacrylate compositions are also known to show blooming when cured, which tends to be absent with β-methoxy ethyl cyanoacrylate.

Today there are no toughened, low odor/low bloom cyanoacrylate products commercially available in the market. Commercially available toughened cyanoacrylate products are predominately based on ethyl cyanoacrylate monomer and exhibit (1) an odor that some end users find offensive and/or (2) sometimes blooming when cured.

Commercially available cyanoacrylate products are often toughened with an ethylene:methyl methacrylate terpolymer. This polymer contributes little toughness to cyanoacrylate compositions containing β-methoxy ethyl cyanoacrylate, one reason for which may be that the polymer shows sparing solubility in β-methoxy ethyl cyanoacrylate.

Notwithstanding the state of the art and the efforts to date to improve the toughness of β-alkoxyalkyl cyanoacrylate compositions, there remained a long felt, yet unmet, need to provide toughness to cured reaction products of such cyanoacrylate compositions, and while doing so minimize the odor and/or blooming oftentimes associated with cyanoacrylate compositions. Until now.

SUMMARY

Cyanoacrylate compositions (a) a β-alkoxyalkyl cyanoacrylate component, (b) a cyanoacrylate component selected from butyl cyanoacrylates, octyl cyanoacrylates, and combinations thereof; (c) a rubber toughening component; (d) a surface modified component; and (e) an adhesion promoter, are thus provided.

The inclusion of the β-alkoxyalkyl cyanoacrylate component provides a cyanoacrylate base for the composition that does not emit an odor commonly found in cyanoacrylate compositions. The cyanoacrylate component recited above provides a vehicle by which to introduce a rubber toughening component to the β-alkoxyalkyl cyanoacrylate component. The rubber toughening component provides for improved toughness, as is shown in the Examples. Rubber toughening components are sometimes known to show sparing solubility in cyanoacrylate compositions, particularly cyanoacrylate compositions containing beta-alkoxyalkyl cyanoacrylates. As a result, the toughness observed in prior attempts has been limited at best. The cyanoacrylate component recited above aids in that regard.

This invention is also directed to a method of bonding together two substrates, which method includes applying to at least one of the substrates a composition as described above, and thereafter mating together the substrates.

In addition, the present invention is directed to reaction products of the inventive compositions.

Also, the invention is directed to a method of preparing the inventive compositions, and a method of conferring improved toughness to a cured reaction product of a cyanoacrylate composition, while minimizing the odor oftentimes associated with cyanoacrylate compositions as well as bloom sometimes observed with cured product thereof.

The invention will be more fully understood by a reading of the section entitled "Detailed Description", which follows.

DETAILED DESCRIPTION

As noted above, this invention is directed to a cyanoacrylate composition comprising (a) a β-alkoxyalkyl cyanoacrylate component, (b) a cyanoacrylate component selected from butyl cyanoacrylates, octyl cyanoacrylates, and combinations thereof; (c) a rubber toughening component; (d) a surface modified component; and (e) an adhesion promoter.

The β-alkoxyalkyl cyanoacrylate component (a) may be chosen from β-methoxymethyl cyanoacrylate, β-methoxyethyl cyanoacrylate, β-ethoxymethyl cyanoacrylate, β-ethoxyethyl cyanoacrylate and combinations thereof. Particularly desirable among those β-alkoxyalkyl cyanoacrylates is β-methoxyethyl cyanoacrylate.

The β-alkoxyalkyl cyanoacrylate component (a) should be included in the compositions in an amount within the range of from about 40% to about 90% by weight, such as from about 55% to about 85% by weight, for example from about 55% to about 80% by weight being desirable, with the range of about 55% to about 75% by weight being particularly desirable, and about 60% by weight of the total composition being particularly suitable.

The cyanoacrylate component (b) may be selected from butyl cyanoacrylates (such as n-butyl cyanoacrylate), octyl cyanoacrylates (such as n-octyl cyanoacrylate), and combinations thereof.

The cyanoacrylate component (b) should be included in the compositions in an amount within the range of from about 5% to about 50% by weight, such as from about 5% to about 30% by weight, suitably from about 7% to about 27% by weight. About 10% to about 30% by weight may be employed, with the range of about 20% to about 35% by weight being desirable, and about 30% by weight of the total composition being particularly desirable.

Suitably, the β-alkoxyalkyl cyanoacrylate component (a) and the cyanoacrylate component (b) are present in the composition in a by weight ratio of from about 55 to about 85:about 5 to about 30.

The rubber toughening component (c) may be selected from (i) reaction products of the combination of ethylene, methyl acrylate and monomers having carboxylic acid cure sites, (ii) dipolymers of ethylene and methyl acrylate, (iii) vinylidene chloride-acrylonitrile copolymers, (iv) vinyl chloride/vinyl acetate copolymer, (v) copolymers of polyethylene and polyvinyl acetate, and combinations thereof.

Desirably, the reaction products (c) (i) of the combination of ethylene, methyl acrylate and monomers having carboxylic acid cure sites, where the reaction products are substantially free of release agents, anti-oxidants, stearic acid and polyethylene glycol ether wax, β-alkoxyalkyl cyanoacrylate are chosen for use. DuPont supplies such a reaction product under the trade name VAMAC VCS 5500.

The rubber toughening component (c) should be included in the compositions in an amount within the range of from about 3% to about 20% by weight, with the range of about 5% to about 15% by weight being desirable, and about 8% by weight of the total composition being particularly desirable.

A particularly interesting additive is a surface modified component, which may take many forms. See e.g., U.S. Pat. No. 8,609,780 (Misiak). For instance, Inhance/Fluoro-Seal, Ltd.s' surface-modification technology is a controlled oxidation process in which a reactive gas atmosphere modifies the outermost molecular layer of a particle/fiber/plastic/film or fabric. The treatment causes the molecular backbone and/or side chains to react, resulting in formation of polar functional groups on the surface, such as hydroxyls and carboxylates.

According to Inhance's website, these oxygen-containing chemical functionalities cause the treated particles to have high surface energy. This in turn means that the treated particles are readily wetted and dispersed in polar polymers, such as polyols. The surface modification also results in stronger bonding between the particles (or fibers) and the matrix resin. The enhanced adhesion is a result of chemical bonding with surface functionalities and hydrogen. See www.inhanceproducts.com/technology.html, Aug. 10, 2006.

Commercially available surface modified polyolefins from Inhance include those in the family described as INHANCE® UH-1000 and HD-1000 series particles, Specific representatives of that family include those designated as UH-1045 (having an average size of 300 μm), UH-1080 (having an average size of 125 μm), UH-1200 (having an average size of 63 μm), UH-1250 (having an average size of 53 μm), UH-1500 (having an average size of 45 μm), UH-1700 (having an average size of 38 μm) and HD-1800 (having an average size of 18 μm).

INHANCE® UH-1000 series particles are free flowing white particles or powder, derived from virgin UHMWPE resin, and having the following general properties:
Surface Energy: 55+ dynes/cm (water wettable)
Specific Gravity: 0.93-0.94
Bulk Density: 20-31 lb/ft$^3$ (0.32-0.50 g/cc)
Molecular Weight: 3,000,000-5,000,000

INHANCE® UH-1000 Series Particles are reported to provide composites with superior abrasion resistance, reduced coefficient of friction, enhanced work of fracture and improved moisture barrier.

Another particularly interesting additive is an adhesion promoter, such as phosphoric acid and anhydrides, like itaconic anhydride.

Suitably, the β-alkoxyalkyl cyanoacrylate component (a) is present in an amount of from about 55% to about 80% by weight, and the cyanoacrylate component is present in an amount of from about 7% to about 27% by weight, based on the total weight of the composition.

The cyanoacrylate component (b) may be present in about a 30:70 by weight ratio with the β-alkoxyalkyl cyanoacrylate (a).

Accelerators may also be included in the inventive cyanoacrylate compositions, such as any one or more selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known, and are reported in the patent literature. See e.g. U.S. Pat. Nos. 4,556,700, 4,622,414, 4,636,539, 4,695,615, 4,718, 966, and 4,855,461, the disclosures of each of which are hereby expressly incorporated herein by reference.

For instance, as regards calixarenes, those within the following structure are useful herein:

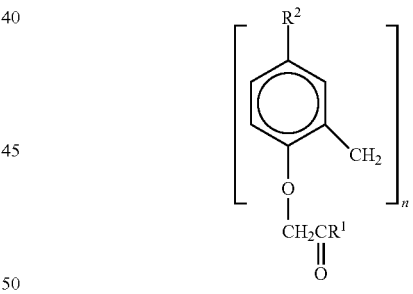

where $R^1$ is alkyl, alkoxy, substituted alkyl or substituted alkoxy; $R^2$ is H or alkyl; and n is 4, 6 or 8.

One particularly desirable calixarene is tetrabutyl tetra[2-ethoxy-2-oxoethoxy]calix-4-arene.

A host of crown ethers are known. For instance, any one or more of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7 may be used. See U.S. Pat. No. 4,837,260 (Sato), the disclosure of which is hereby expressly incorporated herein by reference. Of the silacrowns, again many are known, and are reported in the literature.

Specific examples of silacrown compounds useful in the inventive compositions include:

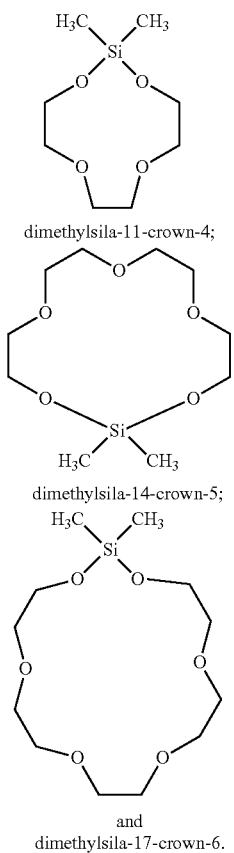

dimethylsila-11-crown-4;

dimethylsila-14-crown-5;

and
dimethylsila-17-crown-6.

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or γ-cyclodextrin which is at least partly soluble in the cyanoacrylate would be appropriate choices for use herein as the first accelerator component.

For instance, poly(ethylene glycol) di(meth)acrylates suitable for use herein include those within the following structure:

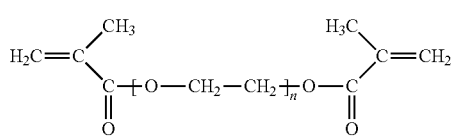

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

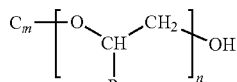

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

When used, the accelerator should be included in the compositions in an amount within the range of from about 0.01% to about 10% by weight, with the range of about 0.1 to about 0.5% by weight being desirable, and about 0.4% by weight of the total composition being particularly desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6,607,632, the disclosures of each of which are hereby incorporated herein by reference.

Other additives may be included in the inventive cyanoacrylate compositions, such as certain acidic materials (like citric acid), thixotropy or gelling agents, thickeners, dyes, and combinations thereof.

Of the accelerators and these additives, those listed in the table below are desirable examples, particularly in the amounts noted.

| Constituent | Broad range | Desirable range |
|---|---|---|
| Crown Ether | 0.1-0.5% | 0.1-0.2% |
| Citric Acid | 50-100 ppm | 100 ppm |
| Silica | 0-10% | 5-6% |

In addition, the cyanoacrylate component may include further cyanoacrylate monomers which may be chosen with a raft of substituents, such as those represented by $H_2C=C(CN)-COOR$, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from methyl cyanoacrylate, ethyl-2-cyanoacrylate, propyl cyanoacrylates, allyl cyanoacrylate, and combinations thereof.

In another aspect of the invention, there is provided a method of bonding together two substrates, which method includes applying to at least one of the substrates a composition as described above, and thereafter mating together the substrates for a time sufficient to permit the adhesive to fixture.

In yet another aspect of the invention, there is provided reaction products of the so-described compositions.

In still another aspect of the invention, there is provided a method of preparing the so-described compositions. The method includes providing (a) a β-akloxyalkyl cyanoacrylate component, and combining therewith with mixing (b) a cyanoacrylate component selected from butyl cyanoacrylates, octyl cyanoacrylates, and combinations thereof; (c) a rubber toughening component, where desirably the rubber toughening component is dissolved in the cyanoacrylate component in an amount of up to about 20% by weight; (d) a surface modified component; and (e) an adhesion promoter.

The invention will be further illustrated by the examples which follow.

EXAMPLES

Sample A was prepared from the constituents in the by weight percentages as set forth in Table A below. Sample A contained n-butyl cyanoacrylate.

TABLE A

| β-Methoxyethyl cyanoacrylate | 59.36 |
|---|---|
| n-Butyl cyanoacrylate | 25.44 |
| Itaconic anhydride | 1.25 |
| Phosphoric acid | 0.25 |
| MMBP | 0.05 |
| Sulfur dioxide | 0.70 |
| Methane sulfonic acid | 1.20 |
| Crown Ether | 0.25 |
| VAMAC MR | 10.00 |
| Silica | 1.00 |
| INHANCE ® microparticles UH-1045 | 0.50 |

Samples B-D were prepared in a similar fashion and are set forth in Table B below. Samples B-D contained octyl cyanoacrylate.

TABLE B

|  | B | C | D |
|---|---|---|---|
| β-Methoxyethyl cyanoacrylate | 76.32 | 67.84 | 59.36 |
| n-Octyl cyanoacrylate | 8.48 | 16.96 | 25.44 |
| Itaconic anhydride | 1.25 | 1.25 | 1.25 |
| Phosphoric acid | 0.25 | 0.25 | 0.25 |
| MMBP | 0.05 | 0.05 | 0.05 |
| Sulfur dioxide | 0.70 | 0.70 | 0.70 |
| Methane sulfonic acid | 1.20 | 1.20 | 1.20 |
| Crown Ether | 0.25 | 0.25 | 0.25 |
| VAMAC MR | 10.00 | 10.00 | 10.00 |
| Silica | 1.00 | 1.00 | 1.00 |
| INHANCE ® microparticles UH-1250 | 0.50 | 0.50 | 0.50 |

To each of Samples A-D MMBP was added in an amount of 0.05 by weight percent as a free radical stabilizer. MMBP is 2,2-Methylenebis-(4-methyl-6-tert-butylphenol).

The samples were then evaluated on mild steel substrates and aluminum substrates at room temperature and/or a temperature of 80° C. over the time period noted in days for T Peel strength performance (measured in N/mm). The results are captured below in Tables C and D.

TABLE C

|  | Room Temperature | | 80° C. (pulled at RT) | |
|---|---|---|---|---|
| Time (Days) | Mild Steel | Aluminum | Mild Steel | Aluminum |
| 1 | 4.93 | 2.44 | 6.97 | 4.59 |
| 2 | 4.80 | 2.13 | 6.80 | 4.69 |
| 5 | 5.45 | 1.76 | 7.38 | 4.62 |
| 10 | 4.96 | 1.83 | 7.22 | 4.97 |
| 15 | 4.59 | 2.11 | 7.45 | 4.34 |
| 20 | 5.04 | 1.58 | 8.28 | 4.92 |

TABLE C-continued

|  | Room Temperature | | 80° C. (pulled at RT) | |
|---|---|---|---|---|
| Time (Days) | Mild Steel | Aluminum | Mild Steel | Aluminum |
| 25 | 4.73 | 1.08 | 8.13 | 4.72 |
| 32 | 4.82 | 0.88 | 8.42 | 4.64 |

TABLE D

|  | Room Temperature (3 Days) | |
|---|---|---|
| Sample | Mild Steel | Aluminum |
| A | 5.2 | 2.54 |
| B | 5.23 | 2.22 |
| C | 5.04 | 2.59 |

These results seem to indicate that the data for room temperature ageing on mild steel substrates show little or substantially no change. In other words on mild steel substrates the samples show a maintenance of T Peel performance on mild steel substrates. However, data for room temperature ageing on aluminum substrates show a decrease in performance. No substantial difference in performance is seen between samples having butyl cyanoacrylate and those having octyl cyanoacrylate.

At elevated temperature conditions over time, Sample A shows an increase in performance over time on mild steel substrates and maintenance of performance over time on aluminium substrates.

What is claimed is:

1. A cyanoacrylate composition, comprising:
   (a) a β-alkoxyalkyl cyanoacrylate component;
   (b) a cyanoacrylate component selected from the group consisting of butyl cyanoacrylates, octyl cyanoacrylates and combinations thereof;
   (c) a rubber toughening component;
   (d) a surface modified component; and
   (e) an adhesion promoter.

2. The cyanoacrylate composition according to claim 1, wherein the β-alkoxyalkyl cyanoacrylate component (a) and the cyanoacrylate component (b) are present in the composition in a weight ratio of from about 55 to about 85:about 5 to about 30.

3. The cyanoacrylate composition according to claim 1, wherein the β-alkoxyalkyl cyanoacrylate component (a) and the cyanoacrylate component (b) are present in a weight ratio of about 70:30, the surface modified component (d) is a polyolefin in particulate form having an average particle size of 500 μm or less, whose surface has been modified through oxidation of the outermost surface thereof, and the adhesion promoter (e) is at least one of phosphoric acid or itaconic anhydride.

4. The cyanoacrylate composition according to claim 1, wherein the β-alkoxyalkyl cyanoacrylate component is selected from β-methoxy ethyl cyanoacrylate, β-ethoxy ethyl cyanoacrylate, or combinations thereof.

5. The cyanoacrylate composition according to claim 1, wherein the rubber toughening component is selected from the group consisting of (a) reaction products of the combination of ethylene, methyl acrylate and monomers having carboxylic acid cure sites, (b) dipolymers of ethylene and methyl acrylate, (c) vinylidene chloride-acrylonitrile copolymers, (d) vinyl chloride/vinyl acetate copolymer, (e) copolymers of polyethylene and polyvinyl acetate, and combinations thereof.

6. The cyanoacrylate composition according to claim 1, wherein the rubber toughening component is a reaction product of the combination of ethylene, methyl acrylate and monomers having carboxylic acid cure sites, wherein the reaction product is free of release agents, anti-oxidants, stearic acid and polyethylene glycol ether wax.

7. The cyanoacrylate composition according to claim 1, further comprising one or more of a thixotrope, a gelling agent, a thickener, an accelerator and a shock resistance conferring agent.

8. The cyanoacrylate composition according to claim 7, wherein the accelerator is selected from the group consisting of calixarene, oxacalixarene, silacrown, cyclodextrin, crown ether, poly(ethyleneglycol) di(meth)acrylate, ethoxylated hydric compound, and combinations thereof.

9. The cyanoacrylate composition according to claim 8, wherein the calixarene is tetrabutyl tetra[2-ethoxy-2-oxoethoxy]calix-4-arene.

10. The cyanoacrylate composition according to claim 8, wherein the crown ether is selected from the group consisting of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6, and 1,2-benzo-1,4-benzo-5-oxygen-20-crown-7 and combinations thereof.

11. The cyanoacrylate composition according to claim 8, wherein the poly(ethyleneglycol) di(meth)acrylate has the following structure:

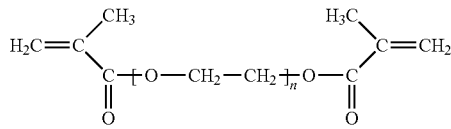

wherein n is greater than 3.

12. The cyanoacrylate composition according to claim 7, wherein the shock resistance conferring agent is citric acid.

13. The cyanoacrylate composition according to claim 1, wherein the β-alkoxyalkyl cyanoacrylate component (a) and the cyanoacrylate component (b) are present in the composition in a weight ratio of from about 55 to about 75: about 20 to about 35.

14. The cyanoacrylate composition according to claim 1, wherein the 3-alkoxyalkyl cyanoacrylate component (a) is present in an amount of from about 55% to about 80% by weight, and the cyanoacrylate component is present in an amount of from about 7% to about 27% by weight, based on a total weight of the composition.

15. The cyanoacrylate composition according to claim 1, wherein the β-alkoxyalkyl cyanoacrylate component (a) and the cyanoacrylate component (b) are present in the composition in a weight ratio in the range of about 70:30.

16. The cyanoacrylate composition according to claim 1, further comprising a stabilizing amount of an acidic stabilizer and a free radical inhibitor.

17. Reaction products of the cyanoacrylate composition according to claim 1.

18. A method of bonding together two substrates, comprising the steps of:
applying a cyanoacrylate composition according to claim 1, to at least one of the substrates, and
mating together the substrates for a time sufficient to permit the cyanoacrylate composition to fixture.

19. A method of preparing a cyanoacrylate composition according to claim 1, comprising the steps of:
providing a rubber toughening component dissolved in a cyanoacrylate component selected from the group consisting of butyl cyanoacrylates, octyl cyanoacrylates, and combinations thereof, and
combining therewith with mixing a β-alkoxyalkyl cyanoacrylate component, a surface modified component; and an adhesion promoter.

* * * * *

UNITED STATES PATENT AND TRADEMARK OFFICE
CERTIFICATE OF CORRECTION

| | |
|---|---|
| PATENT NO. | : 11,299,652 B2 |
| APPLICATION NO. | : 16/858666 |
| DATED | : April 12, 2022 |
| INVENTOR(S) | : Rory B. Barnes, Rachel Hersee and Barry N. Burns |

It is certified that error appears in the above-identified patent and that said Letters Patent is hereby corrected as shown below:

In the Specification

Column 4, Line 13 change from "harrier" to --barrier--.

In the Claims

Column 10, Line 10 Claim 14, change from "3-alkoxyalkyl cyanoacrylate" to --β-alkoxyalkyl cyanoacrylate--.

Signed and Sealed this
Twenty-eighth Day of March, 2023

Katherine Kelly Vidal
*Director of the United States Patent and Trademark Office*